INVENTORS.
RICHARD L. LA FAVE
RICHARD O. PROBST

Attorneys

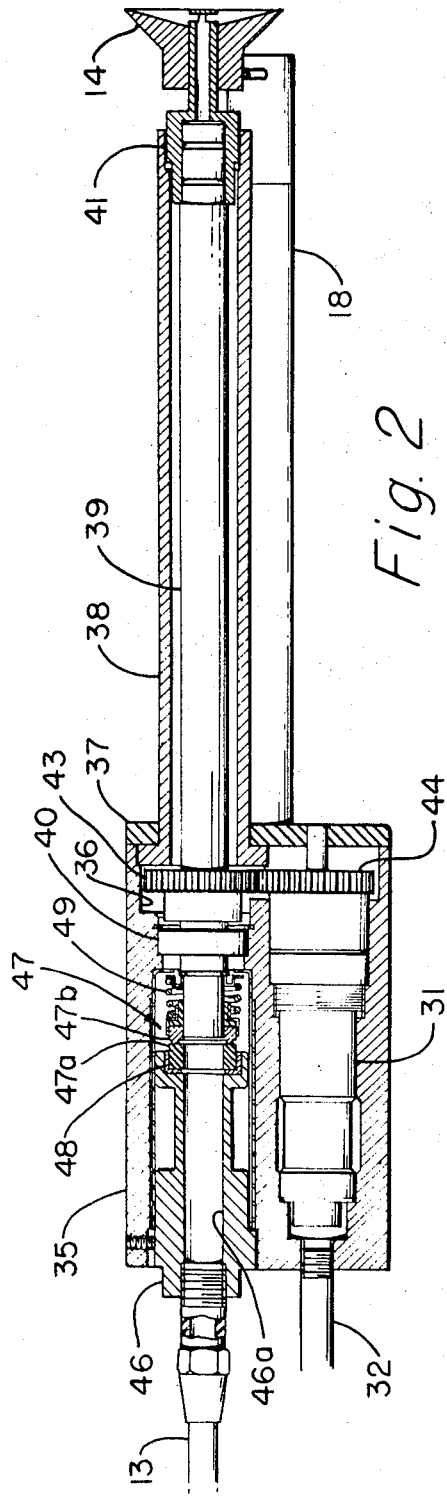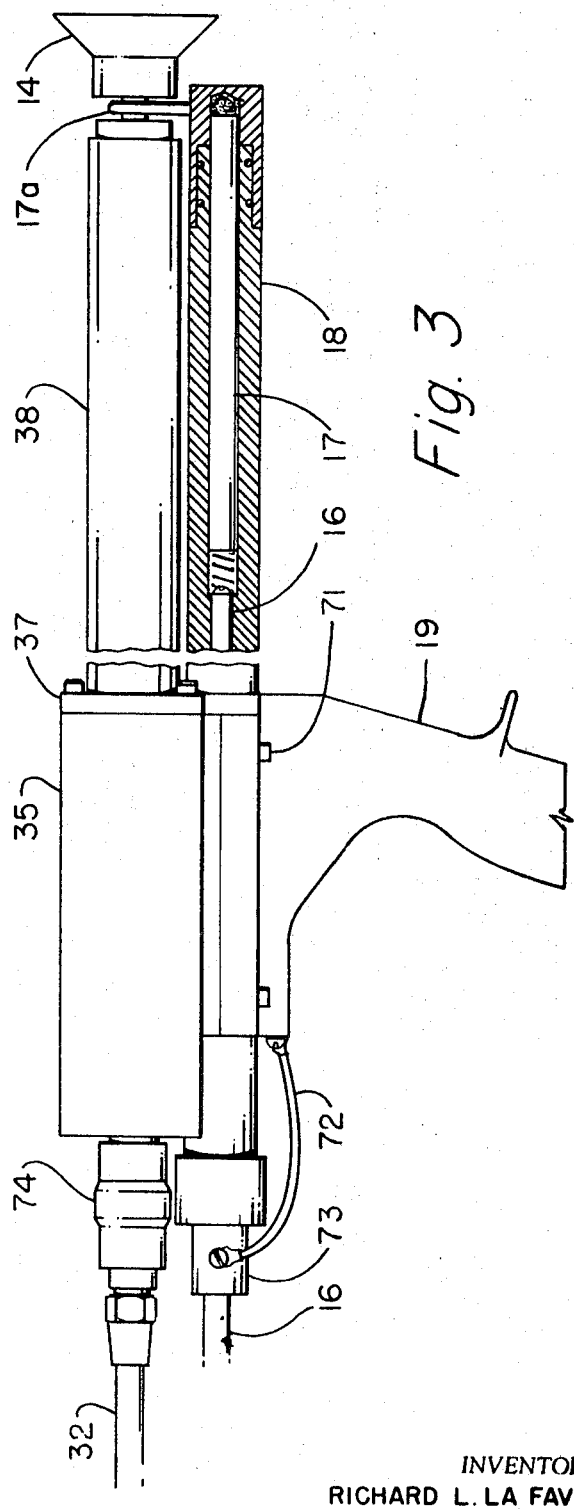

Oct. 27, 1970  R. L. LA FAVE ET AL  3,536,514

ELECTROSTATIC COATING METHOD

Original Filed Feb. 17, 1966  4 Sheets-Sheet 3

INVENTORS.
RICHARD L. LA FAVE
RICHARD O. PROBST

BY Hofgren, Wegner, Allen, Stellman & McCord

Attorneys

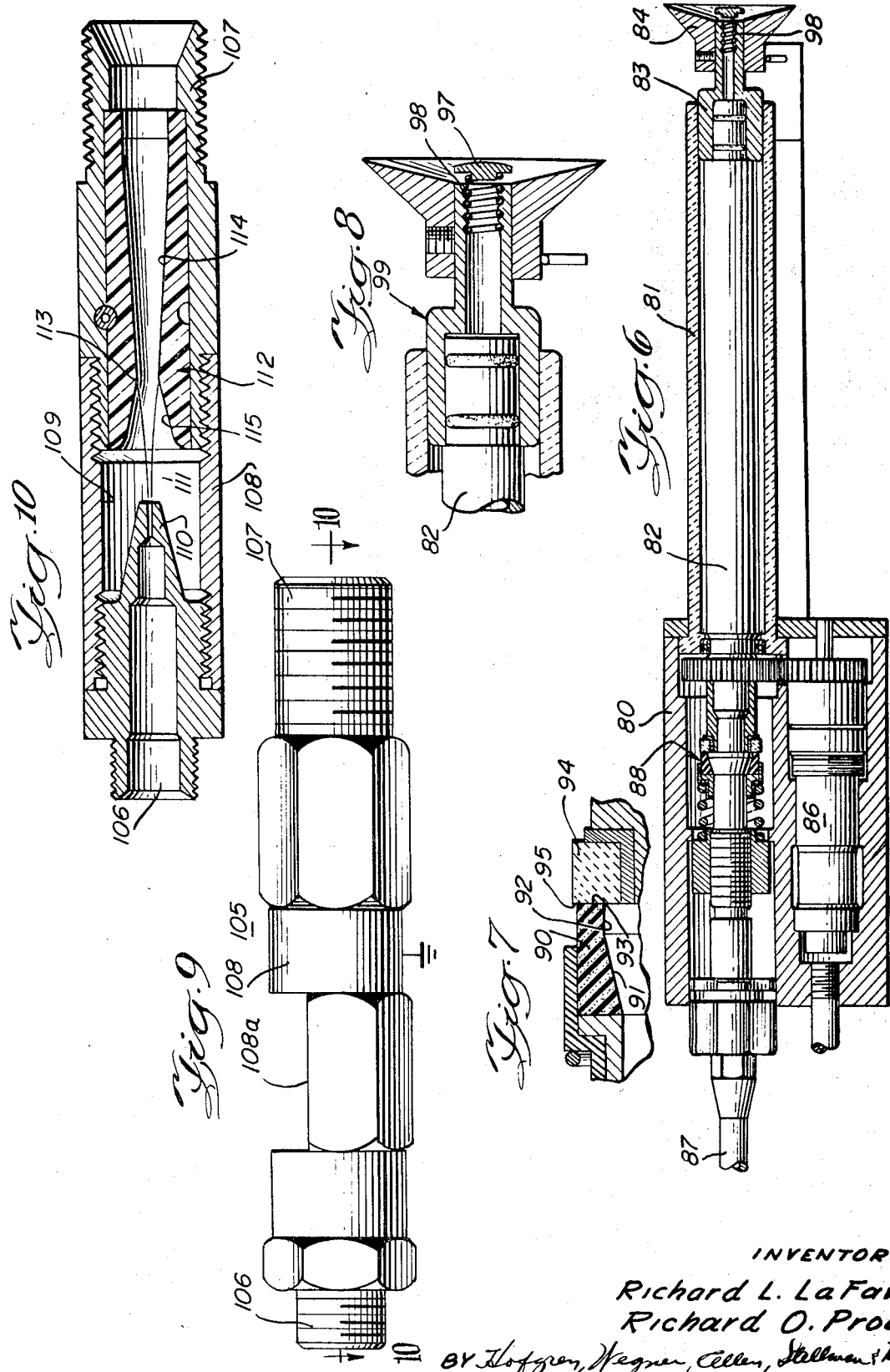

United States Patent Office 3,536,514
Patented Oct. 27, 1970

3,536,514
ELECTROSTATIC COATING METHOD
Richard L. LaFave and Richard O. Probst, Indianapolis, Ind., assignors to Ransburg Electro-Coating Corporation, a corporation of Indiana
Application Feb. 17, 1966, Ser. No. 534,942, which is a continuation-in-part of application Ser. No. 287,638, June 13, 1963. Divided and this application Nov. 21, 1968, Ser. No. 777,631
Int. Cl. B44d 1/094; B05b 5/02
U.S. Cl. 117—17
8 Claims

ABSTRACT OF THE DISCLOSURE

A method for electrostatically coating conductive articles with powder. A mixture of powder and air is delivered through a passage of uniform cross-section and a short section of rotating tube to a rotating bell of nonconductive material having a surface angle with the axis of 50 to 90°. The powder is directed from a nozzle over the bell surface and the entraining air is dissipated laterally. The powder is discharged from the bell into an electrostatic field where the particles acquire a charge and are attracted to and deposited on the grounded articles. A pneumatic jet pump for entraining the powder particle in an air stream has a nozzle and venturi so related that the expnding air from the nozzle blends with the expanding portion of the venturi.

---

This application is a division of our application Ser. No. 534,942, Feb. 17, 1966, which was a continuation-in-part of our application Ser. No. 287,638, filed June 13, 1963, both assigned to the assignee of this invention, now abandoned.

This invention is concerned with coating articles with coating materials entrained in gas, such as a powder entrained in air, and more particularly with a method for charging such coating material, discharging it into an electrostatic field and depositing it on an article.

There are materials, as synthetic plastics for example, which have desirable coating properties, but which cannot advantageously be put into solution for application by normal spray equipment, paint brush or other conventional means. Apparatus and processes have been developed for applying materials in powder form to articles. The powder particles may be fused by heat during or following application so that they bond together and to the article surface to form a solid covering.

In one method, heated articles are dipped in a bed of fluidized powder particles so that the particles are fused thereon and form a coating. In another known process, powder particles are entrained in air and projected by an air stream onto a heated article. In each case, the articles must be heated to or above the softening point of the coating material before the powder particles are applied, so that the particles are softened on contact with the article, adhere to the article and coalesce forming a coating. In both of these methods, heat is required in order that the powder particles adhere to the article. The necessity of preheating the article and the problems involved in maintaining the entire article at a relatively uniform temperature during the coating operation, which is necessary in order to obtain a uniform coating, makes these procedures undesirable. In a further process known as flame spraying, the articles are heated by direct flame contact and powder particles are directed through the flame and onto the heated article. With flame spraying, uneven heating of the article is likely with consequent uneven distribution of powder particles thereon. Furthermore, the flame may adversely effect desirable properties of some coating materials. Proper thermal balance between article temperature, plastic temperature and air temperature is difficult to maintain so that the formed film has all its desirable properties.

Apparatus has been proposed in which powder is entrained in an air stream and blown toward the article to be coated, an electrostatic charge being imparted to the powder as it leaves the device to effect its deposition on the article. A major disadvantage of such apparatus is that the air blast in the direction of the articles tends to blow the deposited particles off the article being coated. This is particularly troublesome where the article has a large surface which tends to deflect the air. Where the article has relatively large open portions, or is of small size, the air blast tends to blow the particles through or past the article. Another disadvantage of such apparatus is the use of a large electroconductive nozzle structure on which powder builds up to a point where the apparatus becomes very inefficient or inoperative. Moreover, the high effective capacity of such a nozzle gives rise to the danger of objectionable electrical discharge. In addition, there are no means for conveniently and readily controlling powder flow rates.

This invention is concerned with a method for electrostatic coating which overcomes these objections.

One feature of the invention is that a powder-air mixture is discharged along the face of a surface which is moved to effect a distribution of the powder particles. The particles are charged electrostatically and deposited on the article under the influence of an electrostatic field extending to the article. More specifically, it is a feature of the invention that the powder-air mixture is discharged from an aperture in the side of a nozzle at the center of a rotating bell. The face of the bell preferably forms an angle with the axis of the nozzle less than 90° and greater than 50°, and the nozzle has a forward end which is preferably spaced rearwardly of the forward edge of the bell. A tubular passage ahead of the nozzle is rotated aiding in distribution of powder in the air.

A further feature is that the bell face is of a nonconductive material while the forward edge of the bell is conductive and is a part of the high voltage charging circuit.

Yet another feature is that the source of powder entrained in air under pressure includes an injector pump having an outlet orifice with a cross-sectional area of the same order of magnitude as the cross-sectional area of the passage means which connects the outlet orifice with the nozzle. The size relationship contributes to a steady, even flow of powder particles. In the pump, the air discharged from a nozzle flows smoothly and with minimum turbulence through a venturi and into the passage to the nozzle.

Further features and advantages of the invention will readily be apparent from the following description and from the drawings, in which:

FIG. 2 is a longitudinal section through a gun used in the system;

FIG. 3 is a longitudinal view, partially in section, of a gun adapted for manual operation;

FIG. 6 is a view similar to FIG. 2 showing a modified embodiment of the invention;

FIG. 7 is an enlarged fragmentary section of the rotating seal;

FIG. 8 is an enlarged longitudinal section through the nozzle and bell assembly of the gun of FIG. 6;

FIG. 9 is an elevation of a modified injector pump; and

FIG. 10 is a longitudinal section through the pump taken generally along the line 10—10 of FIG. 9.

Many materials, and particularly synthetic plastics, have characteristics, such as corrosion resistance, color or dielectric strength which make them desirable as coating materials. For example, epoxy resins may be applied to pipe and fittings used in handling corrosive materials, and polyvinyl chloride powders may be used as coatings for protection and decoration of articles. The particular coating materials used will depend on the nature of the finish required and the conditions to which the article is to be subjected. Some materials which cannot be placed in solution can be applied as powders.

In general the powders are prepared by grinding the bulk material, preferably at a low temperature. The powder particles are preferably of the order of 200 to 400 mesh in size, but may be coarser or finer depending on the particular material and application.

Figure 1:
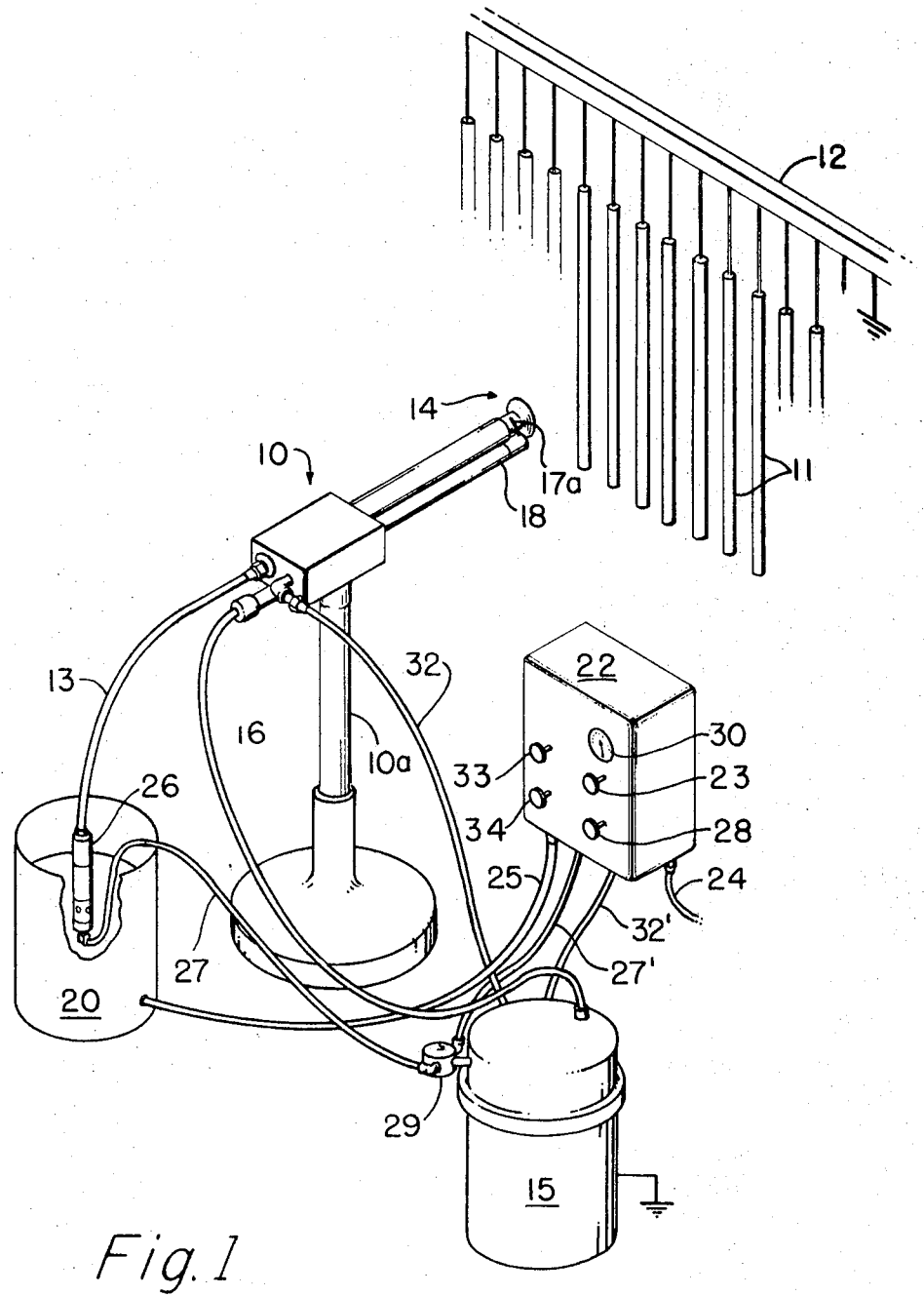
FIG. 1 is a diagrammatic illustration of a system embodying the invention.

An embodiment of the invention is illustrated in FIG. 1, where a powder spray gun 10 mounted on insulating support 10a is shown spraying articles 11 as metal broom handles, carried by a grounded conveyor 12. The powdered coating material is entrained in air by means of a special pump and delivered to the spray gun 10 through a hose 13, and is discharged at the forward end of the gun from a rotating nozzle and bell assembly 14. A high voltage D.C. power supply 15 is connected through cable 16 and a series resistor 17 (FIG. 3), enclosed in an insulating housing 18, with the conductive portions of the nozzle and bell assembly, establishing an electrostatic field from said portions to the articles being coated. The voltage applied is preferably negative. The powder particles acquire an electrical charge, are discharged into the electrostatic field and attracted to and deposited on the article to be coated. The gun may be adapted for manual use merely by removing support 10a and attaching a grounded conductive handle 19, as illustrated in FIG. 3.

The source of powder particles includes a fluidizing bed 20 in which a quantity of the powder is maintained in a fluid state by the passage of air therethrough. A control panel assembly 22 includes valve 23 which controls the flow of air from a source (not shown) through hose 24 and hose 25 to the fluidizing bed. An injector pump 26 positioned in the fluidizing bed has associated with it air inlet hose 27, on-off solenoid valve 29, hose 27', pressure regulating valve 28 and air supply hose 24. The outlet of pump 26 is connected through hose 13 with the spray gun. The pressure of the air to injector pump 26, controlled by valve 28, varies the rate of flow of the powder particles. The air pressure, as indicated on gauge 30, provides a reference which can be used to conveniently and readily duplicate desired powder flow rates.

Nozzle and bell assembly 14 is rotated by an air motor 31 (FIG. 2) to effect a distribution of the powder particles. Motor 31 is connected through hose 32, a flow switch (not shown), hose 32', pressure regulating valve 33 and on-off valve 34 with the air supply hose 24. When the unit is adapted for manual use, valve 34, or an equivalent thereof, is desirably located adjacent the gun within easy access of the operator. Variation of the air pressure to motor 31 changes the speed of rotation of nozzle and bell assembly 14. To assure a suitable distribution of the powder particles, the speed of rotation should preferably be of the order of 400 revolutions per minute or more.

The internal construction of spray gun 10 is shown in FIG. 2. A body 35 of an insulating material has a recess 36 closed at the forward end by a cover 37, also of insulating material. A barrel 38 of insulating material extends forwardly from cover 37. A tubular shaft 39, of insulating material, is rotatably carried inside the barrel by bearing 40 mounted in body 35 and bearing surface 41 mounted at the forward end of barrel 38. A gear 43 on shaft 39 is meshed with gear 44 driven by air motor 31 to rotate shaft 39.

Hose 13, from injector pump 26, is connected with a plug 46 threaded to the rear of body 35 and having a passage 46a therethrough. The powder coating material flow passage is completed to the tubular shaft 39 by a rotary surface seal 47 including a ceramic seal seat 47a carried by a support ring 48, and a graphite seal face 47b mounted on the end of the shaft. Spring 49 extends between bearing 40 and seal face 47b urging the seal-shaft assembly to the rear and effecting a tight seal with seal seat 47a. In hose 13 the powder tends to separate from the air and travel along the bottom of the flow passage. The rotation of tubular shaft 39 counteracts this tendency and distributes the powder in the air stream.

FIG. 3 illustrates a gun adapted for manual operation. Internally the manual gun is the same as the gun shown in detail in FIG. 2. As previously mentioned, support 10a is replaced by a metal handle 19 secured as by screws 71. A conducting lead 72 connects the handle to the grounded sheath 73 of high voltage cable 16. Also, an on-off air valve 74, near the gun, is preferably used in place of valve 34.

Nozzle and bell assembly 14 (FIG. 4a) is mounted at the forward end of rotating shaft 39. A nozzle 52 has a hub portion 52a which telescopes over the end of tubular shaft 39. Passage 52b through the nozzle terminates in lateral outlet apertures 53 through which the powder particles flow in a direction generally at right angles to the axis 52c of the nozzle. The end of nozzle passage 52b is closed by a cap 54. Nozzle 52, cap 54 and powder distributor bell 58 are preferably of nonconductive material with the rear face or outer surface 60 of bell 58 being provided with a conductive coating 61 having a high resistivity, as for example of the type described in U.S. Pat. 3,021,077. A brush 17a connects with the forward end of resistor 17 and bears against conductive coating 61. As previously described, the other end of resistor 17 is connected by high voltage cable 16 to a voltage supply 15. An electrostatic field is thus established in the space between the bell edge and the article being coated. Alternatively, as shown in FIG. 4b, sleeve 55 and cap 54' may be of a conductive material in which case brush 17a bears against the surface of the sleeve establishing the cap at a high D.C. potential. In any event, and particularly with manually operable guns, it is desirable to keep to a minimum the quantity of metallic conductive material at the forward end of the gun to minimize the effective electrical capacity of the apparatus. The advantages of minimizing the effective capacity are disclosed in U.S. Pat. 3,048,498. The safety features disclosed in that patent are desirably incorporated in the gun according to this invention, particularly when designed for manual use.

The powder distributor bell 58 is mounted on the nozzle and has a face or forward surface 59 which is pitched forward slightly from a plane at right angles to the nozzle axis. Nozzle outlet apertures 53 are immediately adjacent the front concave face 59 of the bell near the rotational center thereof, so that the flow of coating material particles is outward along the bell surface. Rotation of the bell as the particles are discharged tends to effect a uniform distribution of the particles on the article in a circular pattern.

The forward surface of the end cap 54 of nozzle 52 is preferably spaced slightly behind the forward edge 59e of the face of the bell. The electrostatic field for charging and depositing the powder particles preferably extends from the bell edge 59a, or alternatively from the forward edge of nozzle end cap 54', or from both. Where the nozzle is conductive efficiency is impaired if the nozzle extends too far forwardly of bell edge 59a. The charge on the particles is greatest when the field gradient at the edge 59a is greatest.

Bell face 59 is preferably of a nonconductive material in order to reduce the tendency of the powder particles to build up a coating thereon and for reasons of safety, as mentioned above. The forward face or inner surface 59 of the bell, whether straight or curved, has a slight forward pitch, forming an angle preferably greater than 50° and less than 90° with the axis 52c of the nozzle. The radial flow across the surface of the bell tends to prevent a build-up of particles on the face without establishing an air flow in the direction of the articles being coated, which would be likely to blow off particles which have been deposited and decrease deposition efficiency. The rear face 60 of the bell preferably has an angle of the order of 45° with nozzle axis 52c. This reduces the tendency of charged particles to deposit thereon and sharpens the edge 59a so that the electrical field gradient thereat will be high. However, the angles can be varied considerably where changes in pattern size are permissible.

Figure 5:
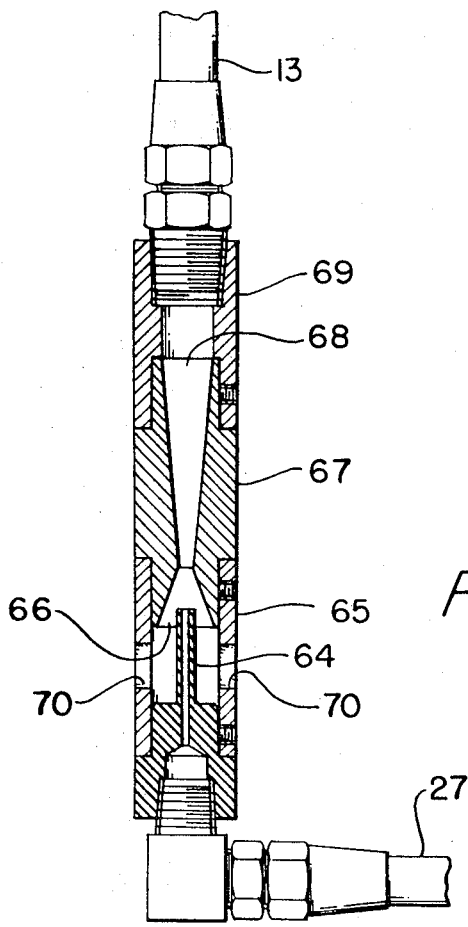
FIG. 5 is a longitudinal section through the injector pump.

Injector pump 26 is illustrated in detail in FIG. 5. Compressed air is introduced through hose 27 from the control assembly 22, to a nozzle 64 which extends through a coupling 65 into the inlet portion 66 of a venturi 67. The venturi outlet 68 is connected through an adapter 69 with hose 13. When this pump is immersed in the fluidizing bed 20 the powder particles are drawn from the fluidizing bed into pump through ports 70 in the wall of coupling 65, where they mix with the incoming air and are blown through hose 13 to the gun 10.

A uniform flow of coating material particles through the system is desirable. The cross-sectional area of the outlet orifice of the discharge portion 68 of the venturi has a controlling effect on the concentration of powder particles in the air stream. The cross-sectional area of the flow passage through adapter 69 and hose 13 is preferably about the same as the cross-sectional area of the discharge orifice on venturi 67, to avoid bunching and an irregular flow of the powder particles. Apertures 53 are of smaller cross-section than the flow passage 52b, thus insuring a fast uniform flow of the powder-air mixture immediately adjacent the apertures. In a specific embodiment, the outlet of the injector pump has a diameter of three-eighths inch, and the rotating shaft 39 has an internal diameter of three-eighths inch.

During the coating operation, the charged particles are attracted by the grounded articles to be coated and are held on the article by electrostatic attraction. As the coating becomes thicker, the particles retain their electric charges and repel the accumulation of additional particles. The maximum thickness of the coating which can be applied varies with the electrical properties of the different materials and with the voltage applied to the system. The particles deposited on the article being coated will tend to accumulate first in the area most closely aligned with the axis of the gun. As the maximum coating thickness is achieved in this area, the deposition pattern expands and the particles are deposited on more distant portions of the article surfaces. The result is that the entire article tends to acquire a uniform coating with a minimum of relative movement between the gun and the article. If the spraying is continued after the article is coated to maximum thickness, the powder particles will merely fail to be deposited on the article. Such excess particles may be recovered from adjacent surfaces other than the article in any suitable manner.

After a coating of the desired thickness is deposited on the article, it is cured in a suitable manner, as by heating to the melting temperature of the coating material. In some cases additional applications of powder may be necessary to achieve a thicker coating. Preheating of the article being coated increases the maximum thickness of the coating which can be achieved. The particles are heated upon contact with the article and since the electrical properties of the hot material are different from those of the cold, the charge is dissipated rapidly permitting the deposition of additional particles.

In one specific example, three ⅛ inch steel wires arranged on 3 inch centers were conveyed past a spray gun at 60 feet per minute. Powdered vinyl plastic material (General Synthetics and Plastics Company, Polydur series 7000) was sprayed using an air pressure of 50 pounds per square inch, measured in the line to injector nozzle 64, with a delivery rate of 150 grams of powder per minute. The gun had a conductive nozzle with an insulating bell having a face angle of 80°, and the spacing between the bell and the wires was 10 inches. The voltage from the power supply was approximately 90 kilovolts. Following spraying, the wires were subjected to a curing cycle of 375° F. for a period of ten minutes. A vinyl film of three to four mils thickness was formed on the wires.

In another example, a stationary steel panel 3 inches by 6 inches was coated with a General Mills epoxy resin (NP-A 10-741). The powder was primarily composed of 26 percent, 140 mesh particles; and 42 percent, 200 mesh particles. The steel plate was preheated to a temperature of 300° F. The coating material was discharged by means of an insulating nozzle and insulating bell provided with a conductive coating and having a face angle of 75°. The bell was spaced 6 inches from the panel and a voltage of 60 kilovolts was used. The film was allowed to build up to its maximum thickness which varied from 8 to 10 mils across the surface of the panel after curing.

An important characteristic of the powder handling system is that the powder-air mixture flow smoothly and uniformly, and without building up deposits. If the flow is not smooth and uniform, the coating deposited may be of varying thickness; and when the flow is heavy the powder particles may not receive sufficient charge to be deposited on the article being coated.

The embodiment of the invention illustrated in FIG. 6 differs from that of FIG. 2 in two important respects, both of which contribute to the smooth, even flow of powder. As in FIG. 2, a body 80 has mounted thereon a barrel 81 of insulating material through which extends a rotating tubular shaft 82, the forward end of which is carried by a bearing 83 and on which is mounted a bell 84. Shaft 82 is driven by air motor 86. A powder-air mixture is supplied to the gun through a flexible hose 87, connected to the rear of body 80. The embodiment of the invention illustrated in FIG. 6 differs from that of FIG. 2 primarily in the structure of seal 88 between the fixed portion of the powder-air conduit and rotating tubular shaft 82, and in the nozzle and deflector structure of bell 84.

The seal of FIG. 2 has a tendency for some powders to accumulate in the annular groove between ceramic seal seat 47a and graphite seal face 47b. A large accumulation of powder in this groove slows and may stop rotation of shaft 39. As best seen in FIG. 7, graphite face seal 90 is tapered outwardly from the rear thereof toward the front along surface 91, ending in a cylindrical section 92 and an annular forward sealing face 93. The ceramic seal element 94 which turns with shaft 82 has a planar rear face 95 of greater radial extent than face 93 of the ceramic seal seat, the central annular portion of face 95 is in engagement with and rotates on face 93. The relatively open area between tapered face 91 and the rear face 95 of the graphite seal member permits a sufficient flow of air to prevent accumulation of powder.

Figure 4A:
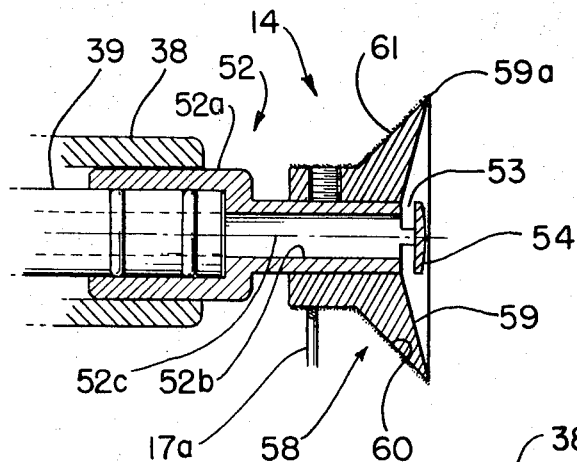
FIG. 4a is an enlarged longitudinal section through the nozzle and bell assembly of the gun.
Figure 4B:
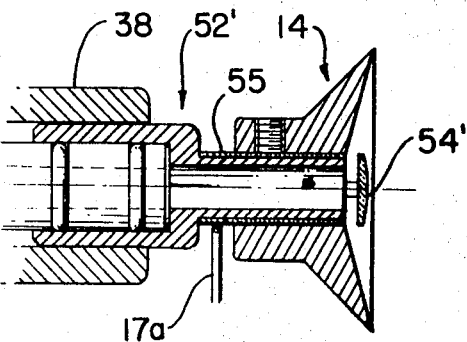
FIG. 4b is an enlarged longitudinal section through another embodiment of the nozzle and bell assembly.

Some powders used with the nozzle structures of FIGS. 4a and 4b show a tendency to build up a powder deposit on the short legs which support end cap 54 and define the outlet apertures 53. Furthermore, air flow across portions of the forward face of the bells is blocked by the cap supporting legs. Some powders build up on the bell surface in these shielded areas and, when the build-up becomes excessive, the powder is cast off in flakes or chunks which cannot be charged electrostatically and which, even if deposited on the article being coated, do not form a smooth surface. In the detail drawing of FIG. 8, it is seen that cap 97 is supported by the final turn of a coil spring 98 received inside the end of tubular nozzle 99. The coil spring support has only a single section extending between the end of the nozzle and cap 97, rather than two legs as in the structure of FIGS. 4a, 4b, and the supporting spring section extends both circumferentially and axially, between the nozzle proper and cap 97. Thus, no portion of the forward surface of bell 84 is completely blocked, but air flows outwardly across the entire face. As a result of this flow characteristic, the tendency of powder to collect on the bell surface is reduced.

Turning now to FIGS. 9 and 10, an injector pump 105 is illustrated which provides for a large maximum rate of powder delivery with a wide range of linear control of the flow rate as a function of air pressure. The injector pump 105 has an inlet 106 for connection with a suitable source of air under pressure and an outlet 107 connected, as through a flexible hose, with the powder gun. The pump includes a cylindrical outer sleeve 108 which defines a pump chamber 109. Inlet 106 is connected with an air discharge nozzle 110 which opens within chamber 109. Between the nozzle and outlet 107 is a venturi 112. A flow of air from nozzle 110 through venturi 112 creates a reduced pressure within chamber 109 which draws powder from the fluidized bed through opening 108a to mix with the air and pass through the venturi and outlet 107 to the gun. Pump 105 is preferably placed in the fluidized bed in a horizontal position with opening 108a down. With this relation, there is little tendency for powder to collect in and clog the pump when the flow of air through the pump is stopped.

We have found that a condition of minimum turbulence and thus minimum powder build-up is achieved when the flow of air from the nozzle blends smoothly with the venturi. An important factor in this regard is the relationship between the expanding flow of air from the nozzle 110 and the venturi 112. The air flow from the nozzle expands in a generally conical, but not sharply defined pattern. The diameter of the restricted portion 113 of the venturi and its spacing from the nozzle along the axis of the pump are such that it approximates the diameter of the air pattern at that point. The central angle of the conical discharge surface 114 of the venturi approximates or is slightly less than the angle of the expanding air pattern. The inlet surface 115 of the venturi is also smooth and devoid of abrupt discontinuities.

In a specific example, nozzle 110 has a diameter of 0.052 inch and a length of 0.200 inch to create a jet 111 of air that is a stream of air that has an expanding pattern, and adjacent the nozzle a small angle of expansion. The angle of the expanding flow of air in the example is of the order of 13°. The venturi in this pump has a throat diameter of 0.175 inch and a central angle for the discharge surface 114 of approximately 8°, slightly less than the angle of the air pattern. This avoids the formation of eddies which would occur if the angle of the venturi were greater than that of the air flow. The angle of the inlet surface 115 is not critical, so long as it is outside the path of the major air flow and the surfaces are smooth. In the pump described, the angle is 30°. The axial spacing between the nozzle 110 and venturi throat 113 is 0.813 inch.

The relationship between the expanding flow of air created by nozzle 110 and the inside surfaces of the venturi sections 113, 114 and 115 affects the maximum rate of powder delivery and the range of control which may be exercised. In general, of course, for a change in air pressure there is a corresponding change in the air flow and a tendency to effect a corresponding change in the rate at which powder is delivered to the gun. The range of air pressures over which this control is effective varies markedly with different physical relationships of the nozzle and the venturi. The expansion of the jet of air at a point spaced from the nozzle is increased over the expansion of air alone by the inclusion of the air-powder mixture from the fluidized bed. At the point at which the expanding air-powder jet reaches the inside diameter of the venturi, the venturi cross-section should begin to expand providing a smooth transition to the feed tube as shown at 114. This smooth transistion permits a maximum uniform powder flow rate with any given air flow. The design of the pump between the nozzzle 110 and the point at which the expanding jet of air with the entrained powder contacts the walls of the venturi has only a small effect on the flow rate or rate of delivery of the pump, provided the flow of powder from the fluidized bed is not restricted. Thus the chamber 109 can be replaced by other means to hold the nozzle and the venturi in alignment, such as several rods. This would increase the exposure of the fluidized powder to the suction of the pump and slightly improve the rate of powder delivered for a given air flow.

In a specific pump having a nozzle diameter of 0.052 and chamber diameter of 0.600, linear control is afforded over a range of nozzle air pressure of 5 pounds per square inch to 60 pounds per square inch and the corresponding powder delivery rates are from 15 pounds per hour to 75 pounds per hour.

In the fluidized bed itself there is a tendency for a static charge to build up as a result of friction from the flow of air through the plastic particles. This can result in an accumulation of powder particles on the pump and hose surfaces immersed in the bed. The pump illustrated herein has a metal body and is electrically grounded as indicated schematically in FIG. 9, draining any charge which tends to accumulate. This prevents a build-up of powder particles on the pump itself, which might block it and impede the desired flow of powder therethrough.

With some powders, an all-metal pump presents operating problems. For example, with epoxy powders containing latent heat activatable epoxy reatcive hardners and curing accelerators, the friction of the powder air mixture flowing through the pump raises the temperature sufficiently to cause curing of particles which collect on the pump surfaces. The cured plastic material is difficult if not impossible to remove and can plug the pump rendering it useless. Other epoxy and vinyl powders tend to build up on an all-metal pump but do not cure. The pump may be cleaned of the collected powder but this requires shutting down operation and removal of the pump from the fluidized bed.

The tendency of the powder to build up on the pump surface is reduced by reducing the coefficient of friction of the surfaces over which the powder-air mixture flows. In the pump illustrated in FIG. 10, the venturi 112 is formed by a plastic insert of a low friction material, as Teflon, a tetrafluoroethylene of E. I. du Pont de Nemours Co., Inc. This material is not only substantially frictionless but has a high abrasion resistance preventing wearing away of critical surfaces at the throat of the venturi. Both the pure plastic and glass filled plastic have been used successfully. Another material which has been used for the venturi insert is a plastic sold under the trademark Rulon by the Dixon Corp. of Bristol, R.I., which has a higher abrasion resistance than tetrafluoroethylene. This is important where abrasive powders, as welding fluxes, for example, are being handled.

The extremely low coefficient of friction of the materials described above reduces triboelectric charging of the powders and the resulting build-up of powder on the venturi surfaces to the point where it is no longer significant.

Although the coating materials to be used are generally referred to herein as powders, it is to be understood that this invention is not limited thereto. As used herein, "powder" is intended to include any solid particles. For convenience reference has been made to powder particles entrained in air. However, the powder may be entrained in gaseous mediums other than air, and "air" is intended to include other suitable gases.

We claim:
1. A method for coating a grounded article with particles of powder, including the steps of:

entraining the coating powder in air;

delivering the powder-air mixture through a passage to an orifice;

orienting the flow of powder-air mixture through the passage in the direction of the article;

discharging the powder-air mixture from the passage through the orifice, substantially at right angles to the flow through said passage and along the face of an extended generally smooth, unobstructed, planar, nonconducting surface, moving the surface in the plane thereof at a speed sufficient to distribute the powder uniformly thereover; and establishing an electrostatic field extending from adjacent said surface to said article, charging said particles and effecting their attraction to and deposition on said article, the flow of entraining air being dissipated by discharge in the direction of the plane of said surface and away from said article.

2. The method of claim 1 wherein the entrained powder is formed into an expanding annular flow along a conical surface and attracted therefrom to said article and the entraining air is deflected into an annular flow expanding outwardly along an extension of the conical surface.

3. The method of claim 2 wherein the conical surface is rotated about its axis.

4. The method of claim 3 wherein said speed of rotation is at least of the order of 400 revolutions per minute.

5. The method of claim 2 wherein the powder-air mixture is discharged at a point adjacent the apex of said conical surface, in a direction generally at right angles to the axis of the surface.

6. The method of claim 2 wherein said electrostatic field is established between the article and the periphery of the conical surface.

7. The method of claim 2 wherein said electrostatic field is established between the article and the center of the conical surface.

8. The method of claim 1 including the step of further mixing the powder into the entraining air immediately prior to discharge through the orifice by rotating the powder-air passage adjacent the orifice.

References Cited

UNITED STATES PATENTS

| | | | |
|---|---|---|---|
| 1,751,343 | 3/1930 | Mack | 239—431 |
| 1,835,603 | 12/1931 | Kincaid | 302—25 |
| 2,571,608 | 10/1951 | Plagge | 239—15 |
| 2,710,773 | 6/1955 | Sedlacsik | 317—3 |
| 2,761,997 | 9/1956 | De Forest et al. | 317—3 |
| 2,764,712 | 9/1956 | Juvinall | 239—15 |
| 2,806,444 | 9/1957 | Werner et al. | 117—93.43 |
| 2,961,581 | 11/1960 | Grave et al. | 239—115 |
| 2,995,393 | 8/1961 | Charp | 239—15 |
| 3,021,077 | 2/1962 | Gauthier | 239—224 |
| 3,048,498 | 8/1962 | Juvinall et al. | 118—631 |
| 3,082,956 | 3/1963 | Point | 239—15 |
| 3,099,497 | 7/1963 | Albert | 302—52 |
| 3,121,024 | 2/1964 | Wampler et al. | 118—631 |
| 3,147,146 | 9/1964 | Sedlacsik | 118—627 |
| 3,160,524 | 12/1964 | Kaiser | 118—621 |
| 3,178,114 | 4/1965 | Point | 118—627 |
| 3,248,606 | 4/1966 | Fraser | 117—170 |

FOREIGN PATENTS

| | | |
|---|---|---|
| 710,852 | 6/1954 | Great Britain. |

WILLIAM D. MARTIN, Primary Examiner

M. SOFOCLEOUS, Assistant Examiner

U.S. Cl. X.R.

118—629